United States Patent
Katsumata

(10) Patent No.: US 9,471,093 B2
(45) Date of Patent: Oct. 18, 2016

(54) CONTROLLING DATA AMOUNTS DISTRIBUTED TO TERMINAL DEVICES

(71) Applicant: FUJITSU LIMITED, Kawasaki-shi, Kanagawa (JP)

(72) Inventor: Akira Katsumata, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 14/306,306

(22) Filed: Jun. 17, 2014

(65) Prior Publication Data
US 2015/0012773 A1  Jan. 8, 2015

(30) Foreign Application Priority Data
Jul. 5, 2013 (JP) .................................. 2013-142152

(51) Int. Cl.
| | | |
|---|---|---|
| G06F 1/12 | (2006.01) | |
| H04J 3/06 | (2006.01) | |
| H04L 29/08 | (2006.01) | |
| H04L 12/26 | (2006.01) | |
| H04L 12/841 | (2013.01) | |

(52) U.S. Cl.
CPC .............. *G06F 1/12* (2013.01); *H04J 3/0667* (2013.01); *H04L 43/0864* (2013.01); *H04L 47/283* (2013.01); *H04L 67/08* (2013.01); *H04L 67/36* (2013.01); *H04L 43/10* (2013.01)

(58) Field of Classification Search
CPC ............. G06F 1/10; G06F 2221/2151; G06F 2201/835; G06F 1/12; H04J 3/0667; H04L 43/0864; H04L 43/10; H04L 47/283; H04L 67/08; H04L 67/36
USPC ............ 370/250, 477, 310.1, 324, 412, 331, 370/252, 254, 318, 400, 235, 237; 709/224, 709/235
See application file for complete search history.

(56) References Cited

U.S. PATENT DOCUMENTS

| | | | | |
|---|---|---|---|---|
| 4,569,042 A * | 2/1986 | Larson | .................. | H04J 3/0632 370/250 |
| 6,940,831 B1 * | 9/2005 | Omi | .................. | H04W 72/1236 370/310.1 |
| 8,718,482 B1 * | 5/2014 | Roberts | .................. | H04B 10/27 398/102 |
| 8,982,776 B1 * | 3/2015 | Pearson | ............ | H04W 56/0065 370/324 |
| 2003/0031185 A1 * | 2/2003 | Kikuchi | .............. | H04L 43/0852 370/400 |
| 2007/0232295 A1 * | 10/2007 | Bell | .................... | H04W 76/025 455/426.1 |
| 2008/0008203 A1 * | 1/2008 | Frankkila | ............ | H04L 47/2416 370/412 |

(Continued)

FOREIGN PATENT DOCUMENTS

| | | |
|---|---|---|
| JP | 2009-177591 | 8/2009 |
| JP | 2010-87625 | 4/2010 |

*Primary Examiner* — Aurel Prifti
(74) *Attorney, Agent, or Firm* — Fujitsu Patent Center

(57) ABSTRACT

An apparatus includes a transmitting unit that transmits data to terminal devices, and further includes a storage unit, an obtaining unit, a calculating unit, and a controlling unit. The storage unit stores time differences between times clocked by the terminal devices and a time clocked by the apparatus. The obtaining unit obtains information indicating a time the terminal devices have received the data. The calculating unit calculates delay amounts of paths to the terminal devices, by using a difference between a time the transmitting unit transmitted the data and the time indicated by the obtained information, and the stored time differences. The controlling unit identifies a delay amount difference in the calculated delay amounts, and controls a data amount transmitted/received to/from the terminal devices in accordance with the identified delay amount difference.

6 Claims, 12 Drawing Sheets

(56) References Cited

U.S. PATENT DOCUMENTS

| | | | | |
|---|---|---|---|---|
| 2008/0049633 | A1* | 2/2008 | Edwards | H04L 43/0852 370/252 |
| 2008/0165723 | A1* | 7/2008 | Kim | H04L 47/10 370/318 |
| 2008/0267217 | A1* | 10/2008 | Colville | H04L 47/10 370/477 |
| 2009/0300211 | A1* | 12/2009 | Gallagher | H04L 47/10 709/235 |
| 2010/0150023 | A1* | 6/2010 | Witzel | H04L 47/10 370/254 |
| 2011/0044199 | A1* | 2/2011 | Kazmi | H04L 43/0864 370/252 |
| 2013/0100816 | A1* | 4/2013 | Bergamasco | H04L 43/0864 370/237 |
| 2013/0129347 | A1* | 5/2013 | Shin | H04B 10/0775 398/25 |
| 2013/0208595 | A1* | 8/2013 | Connolly | H04L 47/266 370/235 |
| 2014/0023035 | A1* | 1/2014 | Zou | H04W 56/0045 370/331 |
| 2014/0192639 | A1* | 7/2014 | Smirnov | H04L 47/10 370/230 |
| 2014/0337505 | A1* | 11/2014 | Chang | H04L 43/0864 709/224 |

* cited by examiner

FIG.6

| CLIENT IP ADDRESS | NETWORK DELAY AMOUNT (MILLISECONDS) | TIME DIFFERENCE VALUE |
|---|---|---|
| 192.168.100.100 | 5 | -10.251 |
| 192.168.100.200 | 10 | +1 min 16.165 |
| 192.167.100.100 | 50 | +0.250 |
| 192.166.100.100 | 60 | -1.311 |

FIG.7

| TRANSMISSION TIME |
|---|
| 11:15:21.225 |

CONTROLLING DATA AMOUNTS DISTRIBUTED TO TERMINAL DEVICES

CROSS-REFERENCE TO RELATED APPLICATION(S)

This application is based upon and claims the benefit of priority of the prior Japanese Patent Application No. 2013-142152, filed on Jul. 5, 2013, the entire contents of which are incorporated herein by reference.

FIELD

The embodiments discussed herein are related to an information processing apparatus and a distribution method.

BACKGROUND

Techniques for synchronizing images displayed by a plurality of terminal devices are conventionally known. As an example of those techniques, a technique related to a remote-connection-type collaborative environment is known by which a server apparatus generates image data and transmits the image data to a plurality of terminal devices via a network.

For example, the server apparatus generates the image data to be displayed by the terminal devices and transmits the generated image data to the terminal devices in accordance with the Transmission Control Protocol (TCP)/Internet Protocol (IP). Further, when having received the image data, each of the terminal devices transmits a response to the server apparatus and displays the received image data. Further, the server apparatus receives the responses from the terminal devices and, when a predetermined time period has elapsed since the previous transmission of the image data, the server apparatus transmits the image data in the next transmission to the terminal devices from which the responses were transmitted. For example, see Japanese Laid-open Patent Publication No. 2009-177591 and Japanese Laid-open Patent Publication No. 2010-087625.

The abovementioned technique, however, has a problem that the display images of the terminal devices are sometimes not synchronized, depending on the environment of the network that connects the server apparatus to the terminal devices.

For example, if the delays of the communication paths to the terminal devices are mutually different, even if the server apparatus transmits the image data to the terminal devices simultaneously, it is not possible to synchronize the times at which the terminal devices display the image data because the terminal devices receive the image data at mutually-different times.

Also, the server apparatus is configured to transmit a new piece of image data after having received a response to the image data in the previous transmission. Because of this configuration, if a certain terminal device has a Round Trip Time (RTT) (i.e., a time period between the transmission of image data and the receipt of a response thereto) that is longer than the transmission time interval of the image data, the server apparatus may, in some situations, transmit image data after other terminal devices have already displayed the image data. In that situation, it turns out that the terminal device displays image data that is different from the image data displayed by the other terminal devices.

Further, another technique is also known by which, for the purpose of synchronizing images displayed by terminal devices, the delays in a network are calculated by using a time at which a server apparatus transmitted data and times at which clients received the image data, so as to vary the method for transmitting the image data in accordance with the calculated delays. In this technique, however, it is difficult to synchronize the times clocked by the terminal devices. Further, because the network environment dynamically changes, if the delays or the like in the network to which the server apparatus and the terminal devices belong are occasionally measured by using a command such as with a ping, the amount of communication packets are increased, and the load on the network is thereby increased.

SUMMARY

According to an aspect of an embodiment, an information processing apparatus transmits data to a plurality of terminal devices. The information processing apparatus includes a storage unit, a transmitting unit, an obtaining unit, a calculating unit, and a controlling unit. The storage unit stores therein time differences between times clocked by the terminal devices and a time clocked by the information processing apparatus. The transmitting unit transmits the data to each of the terminal devices. The obtaining unit obtains information indicating a time at which each of the terminal devices has received the data. The calculating unit calculates, for each of the terminal devices, a delay amount of a path used for transmitting the data to the terminal device, by using a subtraction result between a time at which the transmitting unit transmitted the data and the time indicated by the information obtained by the obtaining unit, as well as the time difference stored in the storage unit. The controlling unit identifies a delay amount difference by comparing, with one another, the delay amounts calculated by the calculating unit for the terminal devices and further controls a data amount to be transmitted to and received from each of the terminal devices in accordance with the identified delay amount difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a drawing for explaining an example of a client management table according to the first embodiment;

FIG. 7 is a drawing for explaining an example of a transmission time table according to the first embodiment;

DESCRIPTION OF EMBODIMENTS

Preferred embodiments of the present invention will be explained with reference to accompanying drawings. The present disclosure is not limited to the exemplary embodiments described below. Also, any of the exemplary embodiments may be carried out in combination as appropriate, as long as the combination does not cause any contradiction.

[a] First Embodiment

Figure 1:
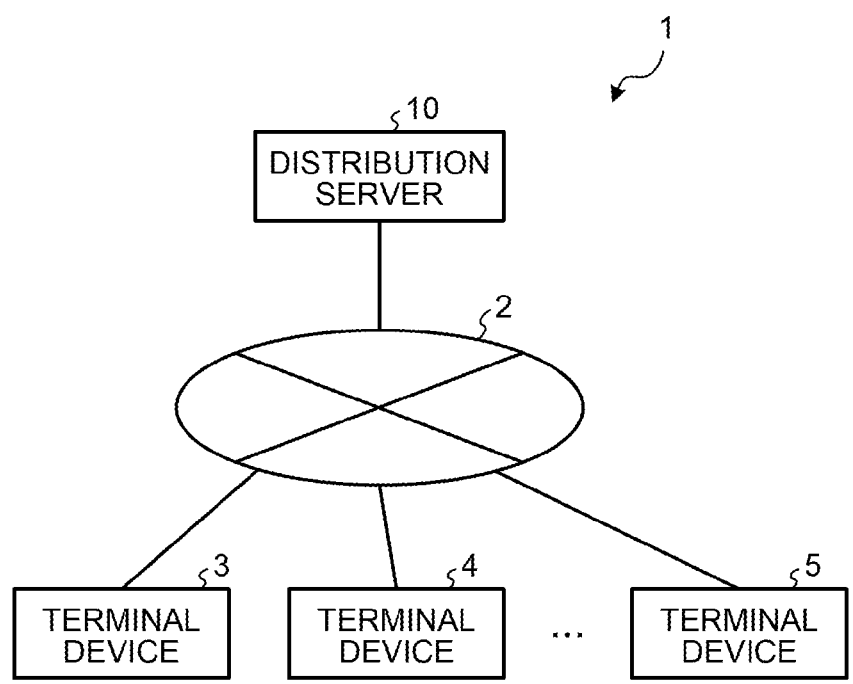
FIG. 1 is a drawing for explaining an exemplary communication system according to a first embodiment.

In a first embodiment, a distribution server that serves as an example of an information processing apparatus according to the present disclosure, as well as an exemplary communication system including the distribution server will be explained, with reference to FIG. 1. FIG. 1 is a drawing for explaining the exemplary communication system according to the first embodiment. In the example illustrated in FIG. 1, in a communication system 1, a plurality of terminal devices 3, 4, and 5 are connected to a distribution server 10 via a network 2. In this situation, each of the terminal devices 4 and 5 achieves the same functions as those of the terminal device 3. Thus, the explanation thereof will be omitted. Further, in addition to the terminal devices 3 to 5, it is assumed that the communication system 1 also includes one or more other terminal devices each of which achieves the same functions as those of the terminal device 3.

The network 2 is a network such as a Local Area Network (LAN), a Wide Area Network (WAN), the Internet, or the like. The terminal device 3 is one of the terminal devices that display a moving picture distributed as streaming data from the distribution server 10 to the terminal devices 3 to 5. For example, the terminal device 3 is a device such as a Personal Computer (PC), a notebook personal computer, a tablet terminal, a portable terminal, or the like that is capable of displaying arbitrary images and moving pictures.

In this situation, the terminal device 3 has an input device such as a keyboard and/or a mouse connected thereto and is configured to transmit, at predetermined time intervals, an interrupt notification indicating the contents of an operation performed on the input device. In the following explanation, the interrupt notification indicating the contents of an operation performed on the keyboard, the mouse, or the like will be referred to as a mouse position interrupt notification.

The distribution server 10 is a server that distributes a moving picture as streaming data, to each of the terminal devices 3 to 5. For example, the distribution server 10 is an information processing apparatus such as a rack-mount type server, for example. The distribution server 10 does not need to be physically configured as a single information processing apparatus and may be realized with a cloud system, for example.

More specifically, the distribution server 10 grants an operation right to one of the terminal devices 3 to 5 and receives an operation performed on an image in accordance with the contents of an input indicated by a mouse position interrupt notification received from the terminal device to which the operation right was granted. Further, the distribution server 10 generates images to be subsequently displayed by the terminal devices 3 to 5 and transmits the generated images to the terminal devices 3 to 5.

Figure 2:
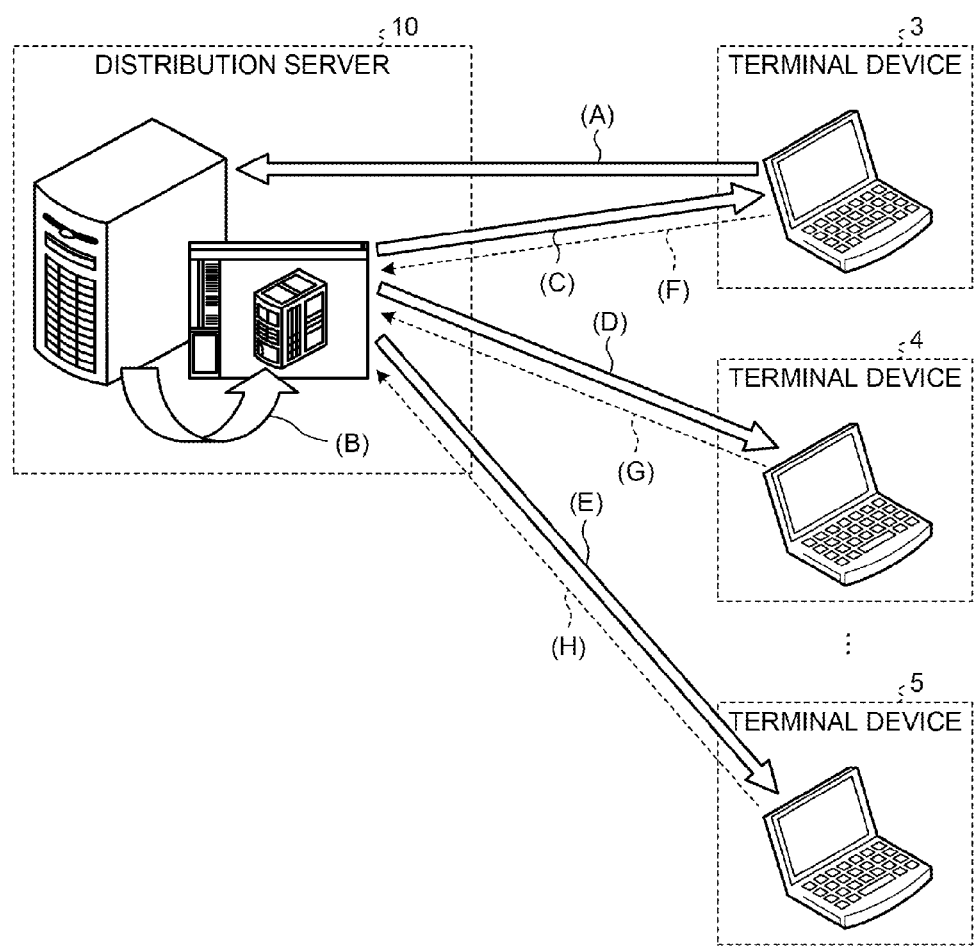
FIG. 2 is a drawing for explaining a flow in a process performed by the communication system according to the first embodiment.

Next, a flow in a process performed by the distribution server 10 to transmit image data of a moving picture to be distributed as streaming data to the terminal devices 3 to 5 will be explained, with reference to FIG. 2. FIG. 2 is a drawing for explaining a flow in a process performed by the communication system according to the first embodiment. FIG. 2 illustrates an example in which the terminal devices 3 to 5 are caused to display a Computer Aided Design (CAD) model, which serves as an example of images distributed to the terminal devices 3 to 5.

For example, among the terminal devices 3 to 5, the distribution server 10 grants an operation right for the images to the terminal device 3. In that situation, as indicated by FIG. 2 (A), the distribution server 10 performs an operation on the CAD model, in accordance with the contents of an operation indicated by a mouse position interrupt notification received from the terminal device 3. For example, the distribution server 10 enlarges the size of, reduces the size of, rotates, moves, or edits the model. Further, as indicated by FIG. 2 (B), the distribution server 10 generates a display image of the model resulting from the operation and transmits the generated display image to each of the terminal devices 3 to 5 as indicated by FIGS. 2 (C), (D), and (E). As a result, each of the terminal devices 3 to 5 displays the image corresponding to the operation performed by the terminal device 3.

Further, as indicated by FIG. 2 (F), the distribution server 10 occasionally receives mouse position interrupt notifications from the terminal device 3 to which the operation right was granted. Further, if the contents of operations indicated by the mouse position interrupt notifications received from the terminal device 3 remain unchanged for a predetermined period of time, the distribution server 10 deprives the terminal device 3 of the operation right. After that, the distribution server 10 grants the operation right to one of the terminal devices of which the contents of an operation indicated by a mouse position interrupt notification change first.

For example, after depriving the terminal device 3 of the operation right, if the contents of an operation indicated by a mouse position interrupt notification received from the terminal device 4 have changed, the distribution server 10 grants the operation right to the terminal device 4, as indicated by FIG. 2 (G). Alternatively, after depriving the terminal device 3 of the operation right, if the contents of an operation indicated by a mouse position interrupt notification received from the terminal device 5 have changed, the distribution server 10 grants the operation right to the terminal device 5, as indicated by FIG. 2 (H). As a result of this process, the terminal devices 3 to 5 are each able to perform an operation while displaying mutually the same image, for example.

In this situation, each of the terminal devices 3 to 5 is connected to the distribution server 10 via a different one of the communication paths. For this reason, the communication paths connecting the terminal devices 3 to 5 to the distribution server 10 have mutually-different network environments represented by, for example, bandwidths, delays, and packet losses. For example, if the distribution server 10 and the terminal devices 3 and 4 are located near Tokyo, whereas the terminal device 5 is located in Sapporo, the delay of the communication path connecting the terminal device 5 to the distribution server 10 is larger than the delays of the communication paths connecting the terminal devices 3 and 4 to the distribution server 10.

For this reason, if the distribution server 10 simply transmits the image data to the terminal devices 3 to 5 at predetermined time intervals, in some situations, the image displayed by the terminal device 5 is not synchronized with the images displayed by the terminal devices 3 and 4. In other words, if the distribution server 10 simply transmits the image data at the predetermined time intervals, a time lag may occur among the frames displayed by the terminal devices 3 to 5 due to the difference in the timing with which the terminal devices 3 to 5 receive the image data.

Figure 3:
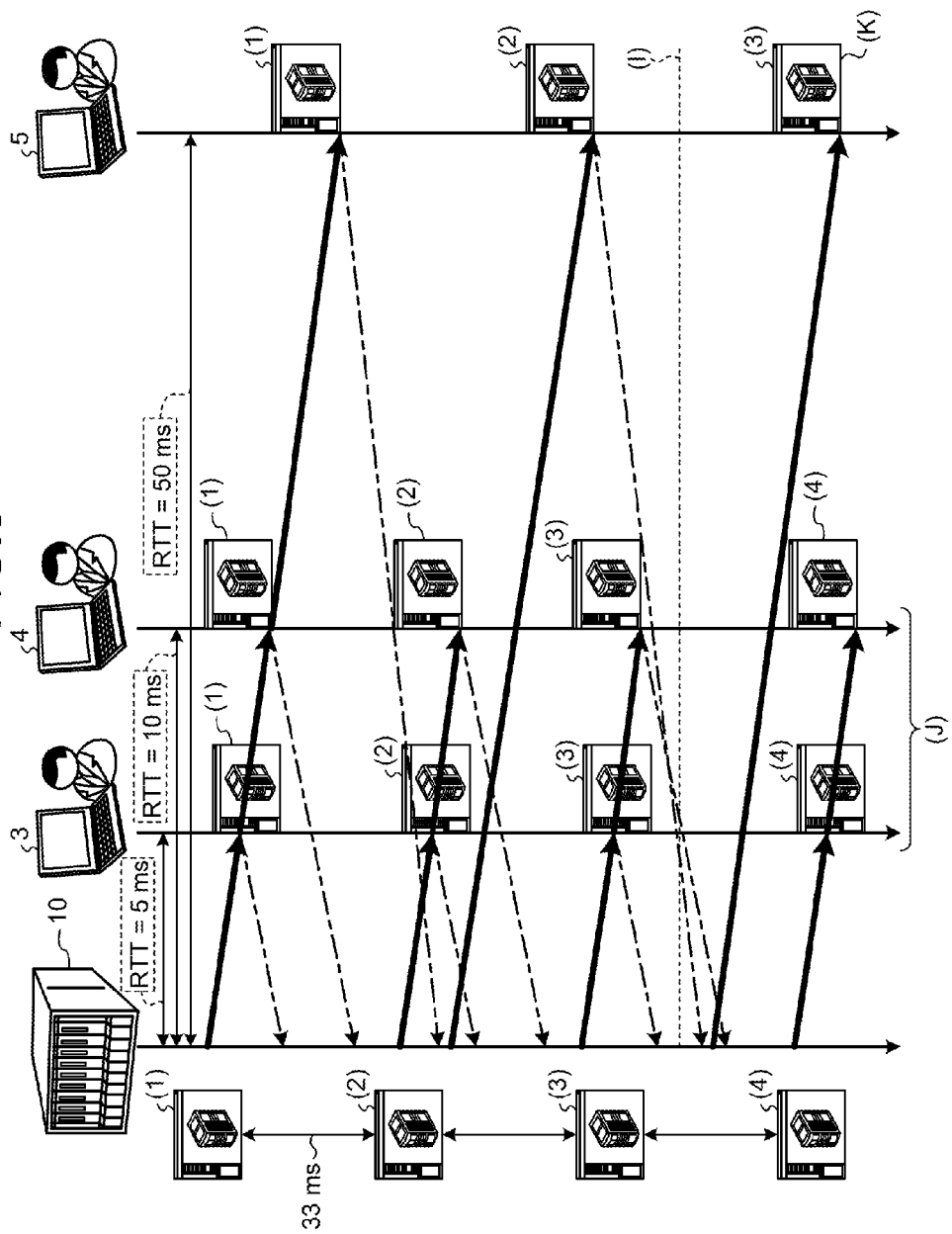
FIG. 3 is a drawing for explaining an exemplary situation in which a time lag occurs between display frames.

Next, an exemplary situation in which a time lag occurs between display frames will be explained, with reference to FIG. 3. FIG. 3 is a drawing for explaining the exemplary situation in which the time lag occurs between the display frames. FIG. 3 illustrates an example in which the distribution server 10 stores image data in a packet and transmits the packet storing the image data therein to each of the terminal devices 3 to 5 by using the TCP/IP.

Further, in the example illustrated in FIG. 3, the RTT of the communication path between the distribution server 10 and the terminal device 3 is 5 milliseconds (ms), whereas the RTT of the communication path between the distribution server 10 and the terminal device 4 is 10 milliseconds. Further, in the example illustrated in FIG. 3, the RTT of the communication path between the distribution server 10 and the terminal device 5 is 50 milliseconds, and the distribution server 10 is configured to generate one image per 33 milliseconds. In other words, the distribution server 10 is configured to generate images of which the frame rate is 30 frames per second (fps).

For example, the distribution server 10 generates an image indicated as FIG. 3 (1) and transmits the generated image to each of the terminal devices 3 to 5. In that situation, when having received the image, each of the terminal devices 3 to 5 transmits a response to the distribution server 10, and also, displays the received image. As a result, the distribution server 10 receives the response from the terminal device 3 when 5 milliseconds have elapsed since the transmission of the image indicated as FIG. 3 (1) and receives the response from the terminal device 4 when 10 milliseconds have elapsed since the transmission of the image.

In this situation, the distribution server 10 generates an image indicated as FIG. 3 (2), when 33 milliseconds have elapsed since the transmission of the image indicated as FIG. 3 (1). Further, the distribution server 10 transmits the image indicated as FIG. 3 (2) to each of the terminal devices 3 and 4 from which the responses to the image indicated as FIG. 3 (1) have already been received. Subsequently, the distribution server 10 receives a response from the terminal device 3 when 5 milliseconds have elapsed since the transmission of the image indicated as FIG. 3 (2) and receives a response from the terminal device 4 when 10 milliseconds have elapsed since the transmission of the image.

Thus, the distribution server 10 generates an image indicated as FIG. 3 (3), when 33 milliseconds have elapsed since the transmission of the image indicated as FIG. 3 (2) and transmits the generated image to each of the terminal devices 3 and 4. As explained here, to each of the terminal devices 3 and 4 of which the RTT of the communication path is equal to or shorter than the frame rate, the distribution server 10 is able to transmit the images with the same frequency as the frame rate. Thus, it is possible to synchronize the images displayed by the terminal devices 3 and 4.

In contrast, the distribution server 10 receives a response from the terminal device 5 when 50 milliseconds have elapsed since the transmission of the image indicated as FIG. 3 (1). As a result, the distribution server 10 transmits the image indicated as FIG. 3 (2) to the terminal device 5 when 50 milliseconds have elapsed since the transmission of the image indicated as FIG. 3 (1). In other words, the distribution server 10 transmits the image data to the terminal device 5 with timing that is slower than the frame rate. For this reason, as indicated by FIG. 3 (I), it turns out that the terminal device 5 displays the image indicated as FIG. 3 (2), at the time when each of the terminal devices 3 and 4 displays the image indicated as FIG. 3 (3).

Further, the distribution server 10 generates an image indicated as FIG. 3 (4) when 33 milliseconds have elapsed since the transmission of the image indicated as FIG. 3 (3) to the terminal devices 3 and 4 and transmits the generated image to each of the terminal devices 3 and 4. As a result, as indicated by FIG. 3 (J), each of the terminal devices 3 and 4 displays the image indicated as FIG. 3 (4). However, the distribution server 10 has not yet received a response to the image indicated as FIG. 3 (3) from the terminal device 5. For this reason, as indicated by FIG. 3 (K), the terminal device 5 keeps displaying the image indicated as FIG. 3 (3).

As explained here, if the distribution server 10 simply transmits the image data to each of the terminal devices 3 to 5, it is not possible to synchronize the images displayed by the terminal device 5, of which the RTT is significantly different from those of the terminal devices 4 and 5, with the images displayed by the terminal devices 3 and 4. Further, if the distribution server 10 keeps performing the process illustrated in FIG. 3, the time lag between the images displayed by the terminal device 5 and the images displayed by the terminal devices 3 and 4 becomes larger, and eventually, skipping occurs in the images displayed by the terminal device 5. When it is not possible to synchronize the images displayed by the terminal devices 3 to 5 as described here, the user of the terminal device 5 may, for example, perform an operation on an image different from the images viewed by the users of the terminal devices 3 and 4, and this may cause confusion in the users' work.

To cope with this situation, the distribution server 10 controls data amounts of the image data to be transmitted to the terminal devices 3 to 5, in accordance with differences in the delay amounts (hereinafter, "delay amount differences") among the communication paths to the terminal devices 3 to 5. For example, if one of the terminal devices has a large difference in the RTT of the communication path, the distribution server 10 reduces the data amount to be transmitted and received by taking one or more countermeasures such as lowering the resolution level of the images, raising the compression rate of the images, and lowering the frame rate of the images, so as to eliminate the difference between this RTT and the RTTs of the other communication paths.

Figure 4:
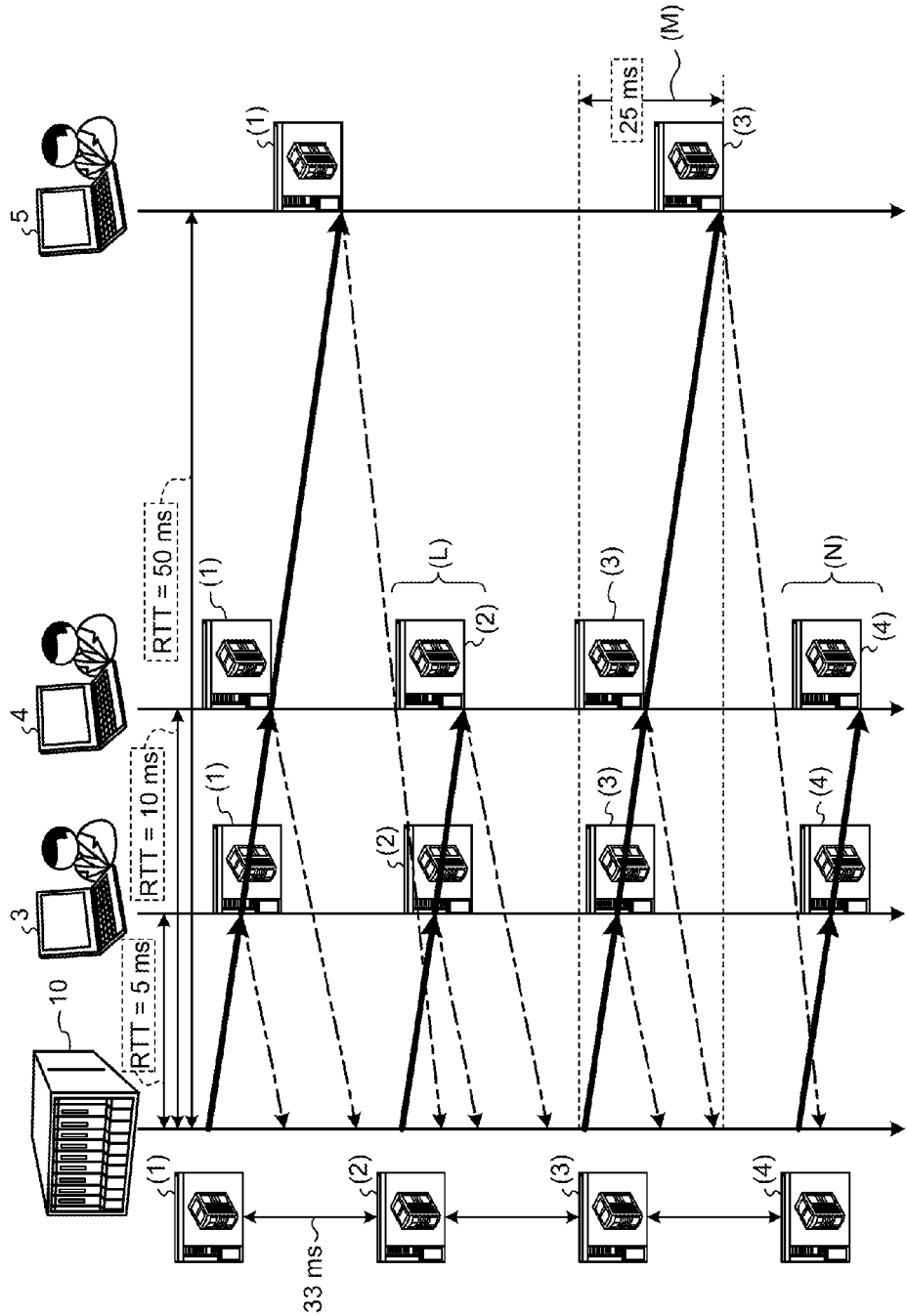
FIG. 4 is a drawing for explaining an example of a data amount controlling process performed by a distribution server according to the first embodiment.

Next, an example of a data amount controlling process performed by the distribution server 10 will be explained. FIG. 4 is a drawing for explaining the example of the data amount controlling process performed by the distribution server according to the first embodiment. Similarly to the example in FIG. 3, FIG. 4 illustrates an example in which the RTT of the communication path between the distribution server 10 and the terminal device 3 is 5 milliseconds. Further, in the example illustrated in FIG. 4, the RTT of the communication path between the distribution server 10 and the terminal device 4 is 10 milliseconds, whereas the RTT of the communication path between the distribution server 10 and the terminal device 5 is 50 milliseconds. Further, in the example illustrated in FIG. 4, the distribution server 10 is configured to generate images of which the frame rate is 30 frames per second (fps).

For example, the distribution server 10 measures a delay amount of each of the communication paths to the terminal devices 3 to 5 and determines that the delay amount of the terminal device 5 is significantly different from the delay amounts of other the terminal devices 3 and 4. As a result, the distribution server 10 sets the frame rate of the images to be transmitted to the terminal device 5 to a value lower than (e.g., a value equal to half of) the frame rates of the images to be transmitted to the terminal devices 3 and 4.

For example, the distribution server 10 generates an image indicated as FIG. 4 (1) and transmits the generated image to each of the terminal devices 3 to 5. Further, the distribution server 10 generates an image indicated as FIG. 4 (2) when 33 milliseconds have elapsed since the transmission of the image indicated as FIG. 4 (1) and transmits the generated image only to the terminal devices 3 and 4, as indicated by FIG. 4 (L).

Further, the distribution server 10 generates an image indicated as FIG. 4 (3) when 33 milliseconds have elapsed since the transmission of the image indicated as FIG. 4 (2) and transmits the generated image to the terminal devices 3 to 5, as indicated by FIG. 4 (M). After that, the distribution server 10 generates an image indicated as FIG. 4 (4) when 33 milliseconds have elapsed since the transmission of the image indicated as FIG. 4 (3) and transmits the generated image to the terminal devices 3 and 4, as indicated by FIG. 4 (N).

As explained here, the distribution server 10 transmits the image data to the terminal device 5 once in every two times. Thus, although the frame rate of the terminal device 5 is lowered, the distribution server 10 is able to synchronize the images displayed by the terminal devices 3 to 5 within less than half of the RTT of the communication path between the terminal device 5 and the distribution server 10.

In another example, if the RTT of each of the terminal devices 3 to 5 is approximately 50 ms, the distribution server 10 is able to synchronize the images displayed by the terminal devices 3 to 5, without the need to control the frame rates of the images to be transmitted to the terminal devices 3 to 5. Thus, if the RTTs of the terminal devices 3 to 5 are approximately equal to one another, the distribution server 10 transmits the images to the terminal devices 3 to 5, without exercising the control over the images.

In this situation, because the network environment for the communication paths between the distribution server 10 and the terminal devices 3 to 5 dynamically changes, it is desirable to occasionally assess the network environment. However, for example, if the distribution server 10 assessed the network environment by transmitting a ping to each of the terminal devices 3 to 5 so as to measure the RTT before a response is received, this assessment process would increase the load on the network.

Alternatively, another method is also possible by which the time at which each of the terminal devices 3 to 5 received image data is acquired, so that the differences between the time at which the distribution server 10 transmitted the image data and the acquired times are considered as the delays of the communication paths. However, in this case, the time clocked by the distribution server 10 needs to be synchronized with the times clocked by the terminal devices 3 to 5 in advance.

To cope with these situations, the distribution server 10 performs a process as follows: First, the distribution server 10 transmits a ping to each of the terminal devices 3 to 5 and stores therein the transmission time of the ping (hereinafter, "ping transmission time"). Each of the terminal devices 3 to 5, then, stores the time clocked thereby into a response to the ping and transmits the response to the distribution server 10. After that, the distribution server 10 compares the time at which the ping is received from each of the terminal devices 3 to 5, with the stored ping transmission time, so as to measure the RTT of each of the communication paths to the terminal devices 3 to 5. Further, the distribution server 10 extracts the time at which each of the terminal devices 3 to 5 received the ping (hereinafter, "ping reception time"), out of the responses received from the terminal devices 3 to 5.

Subsequently, by using the calculated RTTs, the times at which the terminal devices each received the ping, and the stored ping transmission time, the distribution server 10 calculates time differences between the time clocked by the distribution server 10 and the times clocked by the terminal devices 3 to 5. More specifically, for each of the terminal devices 3 to 5, the distribution server 10 subtracts the stored ping transmission time from the ping reception time of the terminal device, and stores a value obtained by further subtracting half of the RTT value from the subtraction result, as a time difference.

Further, when a predetermined period of time has elapsed since the distribution server 10 previously transmitted image data to all of the terminal devices 3 to 5 simultaneously, and also, the distribution server 10 is going to transmit image data again to all of the terminal devices 3 to 5 simultaneously, the distribution server 10 performs a process as follows: First, the distribution server 10 appends a mark instructing that the reception time be reported, to the packet storing the image data therein. For example, the distribution server 10 prepares a predetermined region in the packet storing the image data therein and stores the mark such as a flag instructing that the reception time be reported, into the prepared region. After that, the distribution server 10 transmits the mark-appended image data to each of all the terminal devices 3 to 5 and stores therein the transmission time of the mark-appended image data.

Further, when having received the mark-appended image data, each of the terminal devices 3 to 5 generates a time stamp indicating the reception time of the mark-appended image data. Subsequently, each of the terminal devices 3 to 5 appends the generated time stamp to a mouse position interrupt notification and transmits the time-stamp-appended mouse position interrupt notification to the distribution server 10.

Further, when having received the time-stamp-appended mouse position interrupt notification from each of the terminal devices 3 to 5, the distribution server 10 extracts the time stamp from the received mouse position interrupt notification. After that, for each of the terminal devices 3 to 5, the distribution server 10 calculates a delay of the communication path, by using the reception time indicated by the time stamp, the transmission time of the mark-appended image data, and the stored time difference. Subsequently, on the basis of the calculated delay amounts, the distribution server 10 calculates the delay amount differences and further controls the communication amounts with the terminal devices 3 to 5 in accordance with the calculated delay amount differences. In this situation, each of the "delay amount differences" is represented by the difference between the delay amount of one terminal device and the delay amount of another terminal device and may be represented by, for example, the difference between the delay amount of one terminal device and the smallest value among the delay amounts.

As a result, the distribution server 10 is able to easily synchronize the images displayed by the terminal devices 3 to 5. In other words, the distribution server 10 controls the communication amounts with the terminal devices 3 to 5 in accordance with the delay amount differences among the communication paths to the terminal devices 3 to 5. Thus, the distribution server 10 is able to converge the delay amounts of the communication paths to the terminal devices 3 to 5 into an approximately same level. As a result, the distribution server 10 is able to easily synchronize the images displayed by the terminal devices 3 to 5.

The RTTs of the communication paths between the distribution server 10 and the terminal devices 3 to 5 dynamically change. Thus, it is considered that the difference between the time at which the distribution server 10 transmits image data and the time at which each of the terminal devices 3 to 5 receives the image data changes every time. However, it is presumed that the time difference between the time clocked by the distribution server 10 and the time clocked by each of the terminal devices 3 to 5 is substantially constant.

For this reason, by calculating the time difference with each of all the terminal devices 3 to 5 and by further subtracting the time difference from the difference between the transmission time and the reception time of the image data transmitted to each of all the terminal devices 3 to 5, the distribution server 10 is able to calculate the delay amounts of the communication paths, without the need to transmit a new packet.

Further, the distribution server 10 stores therein the transmission time of the mark-appended image data and receives, from each of the terminal devices 3 to 5, the mouse position interrupt notification to which the time stamp is appended, the time stamp indicating the reception time of the mark-appended image data. Thus, because the distribution server 10 eliminates the need for packets or the like used for measuring the network delays, the distribution server 10 is able to reduce the load on the network.

In this situation, the distribution server 10 is able to perform an arbitrary process to control the communication amounts, in accordance with the delay amount differences among the communication paths to the terminal devices 3 to 5. For example, the distribution server 10 may store therein a reference delay amount in advance or may use either the average value of the measured delay amounts or the smallest value among the delay amounts as a reference delay amount, so as to calculate the difference between the reference delay amount and a judgment target delay amount, as the delay amount difference. After that, if the calculated delay amount difference is larger than a first threshold value, the distribution server 10 instructs the terminal device to lower the frequency with which the mouse position interrupt notifications are transmitted.

If the delay amount difference is larger than a second threshold value that is larger than the first threshold value, the distribution server 10 compresses the images to be transmitted to the terminal device. If the delay amount difference is larger than a third threshold value that is larger than the second threshold value, the distribution server 10 lowers the frame rate of the images to be transmitted to the terminal device. Alternatively, the distribution server 10 may change the resolution level of the images in accordance with the value of the delay amount difference. Further, the distribution server 10 may perform two or more processes in combination, such as lowering the image quality and lowering the frame rate at the same time.

Figure 5:
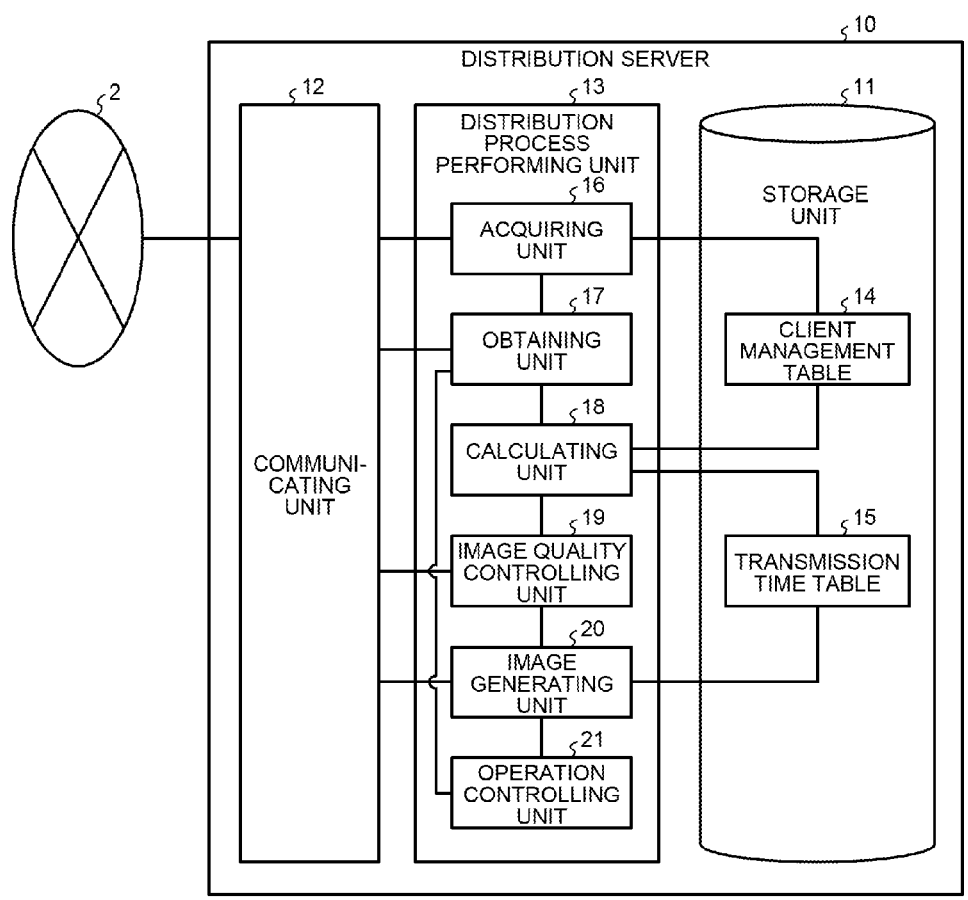
FIG. 5 is a drawing for explaining an exemplary functional configuration of the distribution server according to the first embodiment.

Next, an exemplary functional configuration of the distribution server 10 described above will be explained with reference to FIG. 5. FIG. 5 is a drawing for explaining the exemplary functional configuration of the distribution server according to the first embodiment. For instance, in the example illustrated in FIG. 5, the distribution server 10 includes a storage unit 11, a communicating unit 12, and a distribution process performing unit 13. Further, the storage unit 11 stores therein a client management table 14 and a transmission time table 15. Further, the distribution process performing unit 13 includes an acquiring unit 16, an obtaining unit 17, a calculating unit 18, an image quality controlling unit 19, an image generating unit 20, and an operation controlling unit 21.

First, examples of information stored in the client management table 14 and the transmission time table 15 that are stored in the storage unit 11 will be explained. For each of the terminal devices 3 to 5, the client management table 14 stores therein a time difference value with respect to the distribution server 10.

For example, FIG. 6 is a drawing for explaining an example of the client management table according to the first embodiment. For example, as illustrated in FIG. 6, the client management table 14 stores therein client IP addresses, network delay amounts, and time difference values that are kept in correspondence with one another. In this situation, the client IP addresses are the IP addresses of the terminal devices 3 to 5. Each of the network delay amounts is an RTT that was measured when the distribution server 10 transmitted a ping for the first time. Further, each of the time difference values is a value indicating the difference between the time clocked by the distribution server 10 and the time clocked by a different one of the terminal devices 3 to 5.

For example, in the example illustrated in FIG. 6, the client management table 14 stores therein the client IP address "192.168.100.100", the network delay amount "5" milliseconds, and a time difference value "−10.251" of the terminal device 3 that are kept in correspondence with one another. In other words, the client management table 14 indicates that the network delay amount of the communication path between the terminal device 3 and the distribution server 10 is "5" milliseconds, and the time clocked by the terminal device 3 is "10.251 seconds" slower than the time clocked by the distribution server 10.

Further, in the example illustrated in FIG. 6, the client management table 14 stores therein the client IP address "192.168.100.200", the network delay amount "10" milliseconds, and a time difference value "+1 minute and 16.165" of the terminal device 4 that are kept in correspondence with one another. In other words, the client management table 14 indicates that the network delay amount of the communication path between the terminal device 4 and the distribution server 10 is "10" milliseconds, and the time clocked by the terminal device 4 is "1 minute and 16.165 seconds" faster than the time clocked by the distribution server 10.

Furthermore, in the example illustrated in FIG. 6, the client management table 14 stores therein the client IP address "192.167.100.100", the network delay amount "50" milliseconds, and a time difference value "+0.250" of the terminal device 5 that are kept in correspondence with one another. In addition, in the example illustrated in FIG. 6, the client management table 14 stores therein the client IP address "192.166.100.100", a network delay amount "60" milliseconds, and a time difference value "−1.311" of another terminal device (not depicted) that are kept in correspondence with one another.

Returning to the description of FIG. 5, the transmission time table 15 stores therein the time at which the image data was transmitted to each of the terminal devices 3 to 5. For example, FIG. 7 is a drawing for explaining an example of the transmission time table according to the first embodiment. In the example illustrated in FIG. 7, the transmission time table 15 stores therein the transmission time "11:15:21.225". In other words, the transmission time table 15 stores therein information indicating that the image data was transmitted to each of the terminal devices 3 to 5 at the time expressed as HH:MM:SS.SSS=11:15:21.225.

Returning to the description of FIG. 5, the communicating unit 12 controls the communication between the distribution server 10 and each of the terminal devices 3 to 5. For example, when having received a ping command from the acquiring unit 16, the communicating unit 12 transmits a ping to each of the terminal devices 3 to 5 via the network 2 and informs the acquiring unit 16 of the transmission time of the ping. Further, when having received, via the network 2, a response to the ping from each of the terminal devices 3 to 5, the communicating unit 12 outputs the received responses to the acquiring unit 16 and further informs the acquiring unit 16 of the reception times of the responses.

Further, when having received a mouse position interrupt notification from each of the terminal devices 3 to 5 via the network 2, the communicating unit 12 outputs the received mouse position interrupt notifications to the obtaining unit 17. Further, when having received a change notice instructing that the issuance frequency of mouse position interrupt notifications be lowered and an indication identifying a terminal device serving as the transmission destination (hereinafter, "transmission destination terminal device") from the image quality controlling unit 19, the communicating unit 12 transmits the received change notice to the identified transmission destination terminal device. Further, when having received image data and an indication identifying the transmission destination terminal device of the image data from the image generating unit 20, the communicating unit 12 divides the received image data into pieces of data each having a predetermined size. After that, the communicating unit 12 sequentially transmits a packet storing therein the pieces of data resulting from the division, to the identified transmission destination terminal device.

The acquiring unit 16 acquires the time difference values between the distribution server 10 and the terminal devices 3 to 5. More specifically, the acquiring unit 16 generates the ping to be transmitted to each of the terminal devices 3 to 5 and outputs the generated ping to the communicating unit 12. Further, the acquiring unit 16 receives the transmission time of the ping from the communicating unit 12 and stores therein the received transmission time.

Further, when having received a responses and a reception time from the communicating unit 12, the acquiring unit 16 identifies the terminal device from which the received response was transmitted. Further, the acquiring unit 16 calculates an RTT of the communication path to the identified terminal device on the basis of the difference between the reception time and the stored transmission time.

Further, the acquiring unit 16 extracts the time stamp from the response, the time stamp indicating the time at which the identified terminal device received the ping. The acquiring unit 16 further calculates a value by subtracting half of the calculated RTT value from the difference between the stored transmission time and the time indicated by the extracted time stamp. In other words, the acquiring unit 16 thereby calculates the time difference value between the identified terminal device and the distribution server 10.

After that, the acquiring unit 16 stores the client IP address of the identified terminal device, the calculated RTT, and the calculated time difference value into the client management table 14, so as to be kept in correspondence with one another. Subsequently, when the acquiring unit 16 has calculated a time difference value and has stored the calculated time difference value into the client management table 14 for each of all the terminal devices that are subject to the image synchronization, the process is ended.

For example, the acquiring unit 16 stores therein HH:MM:S.SSS="10:23:0.000", as the transmission time of a ping. Further, when having received a response to the ping from the terminal device 4 at HH:MM:S.SSS="10:23:0.010", the acquiring unit 16 calculates "10 milliseconds" as the RTT of the communication path between the terminal device 4 and the distribution server 10. Further, if the ping has stored therein HH:MM:S.SSS="10:24:16.170" as the time ("ping reception time") at which the terminal device 4 received the ping, the acquiring unit 16 calculates a subtraction result "1 minute and 16.170 seconds" between the ping reception time and the ping transmission time HH:MM:S.SSS="10:23:0.000".

After that, the acquiring unit 16 calculates a time difference value "1 minute and 16.165 seconds" by subtracting "5 milliseconds", which is equal to half of the calculated RTT "10 milliseconds", from the subtraction result "1 minute and 16.170 seconds". Subsequently, the acquiring unit 16 stores the IP address "192.168.100.200", the RTT value "10 milliseconds", and the time difference value "1 minute and 16.165 seconds" of the terminal device 4 into the client management table 14, so as to be kept in correspondence with one another.

The obtaining unit 17 obtains the time at which each of the terminal devices 3 to 5 received the image data. More specifically, when having received a mouse position interrupt notification from the communicating unit 12, the obtaining unit 17 judges whether a time stamp is appended to the received mouse position interrupt notification. If a time stamp is appended to the received mouse position interrupt notification, the obtaining unit 17 identifies the terminal device from which the received mouse position interrupt notification was transmitted and further extracts the time stamp from the mouse position interrupt notification.

After that, the obtaining unit 17 outputs the mouse position interrupt notification to the operation controlling unit 21 and further outputs an indication identifying the identified terminal device and the time stamp to the calculating unit 18. If no time stamp is appended to the mouse position interrupt notification, the obtaining unit 17 outputs the mouse position interrupt notification to the operation controlling unit 21.

For each of the terminal devices 3 to 5, the calculating unit 18 calculates the delay amount of the communication path, by using the transmission time of the image data, the reception time of the image data, and the time difference value stored in the client management table 14. More specifically, the calculating unit 18 receives the indication identifying the terminal device and the time stamp from the obtaining unit 17.

In that situation, the calculating unit 18 obtains the time difference value kept in correspondence with the client IP address of the identified terminal device, by referring to the client management table 14. Further, the calculating unit 18 obtains the transmission time at which the image data was transmitted to each of the terminal devices 3 to 5, by referring to the transmission time table 15. After that, the calculating unit 18 subtracts the obtained transmission time from the reception time indicated by the time stamp received from the obtaining unit 17 and further calculates a value by subtracting the time difference value obtained by referring to the client management table 14 from the result of the subtraction. After that, the calculating unit 18 informs the image quality controlling unit 19 of the indication identifying the terminal device and the calculated value.

For example, the calculating unit 18 receives an indication identifying the terminal device 4 and a time stamp indicating the reception time HH:MM:SS.SSS="11:16:37.400" from the obtaining unit 17. In that situation, the calculating unit 18 obtains the transmission time "11:15:21.225" of the image data from the transmission time table 15 and further calculates the difference "1:16.175" from the reception time. Further, the calculating unit 18 calculates the delay amount "10 milliseconds" of the terminal device 4 by subtracting the time difference value "1 minute and 16.165" of the terminal device 4 stored in the client management table 14 from the calculated difference "1:16.175" and further informs the image quality controlling unit 19 of the delay amount of the terminal device 4.

In this situation, the delay amount calculated by the calculating unit 18 is the delay amount in the one-way traffic on the communication path between the distribution server 10 and each of the terminal devices 3 to 5. Thus, to inform the image quality controlling unit 19 of a delay amount in the round-trip traffic, like the RTTs, on the communication path between the distribution server 10 and each of the terminal devices 3 to 5, the calculating unit 18 informs the image quality controlling unit 19 of a value that is twice as large as the calculated delay amount. For instance, in the example described above, as the delay amount of the terminal device 4, the calculating unit 18 informs the image quality controlling unit 19 of "20 milliseconds", which is twice as large as "10 milliseconds".

In accordance with the delay amount differences among the communication paths to the terminal devices 3 to 5 calculated by the calculating unit 18, the image quality controlling unit 19 controls the data amount to be transmitted to and received from each of the terminal devices 3 to 5. For example, the image quality controlling unit 19 receives indications each identifying a different one of the terminal devices 3 to 5 and the delay amounts thereof from the calculating unit 18. After that, the image quality controlling unit 19 compares the delay amounts of the terminal devices 3 to 5 with one another and judges which one of the following ranges each of the delay amount differences falls within: very small, small, medium, or large. After that, the image quality controlling unit 19 instructs the image generating unit 20 to exercise image control in accordance with the determined range.

For example, the image quality controlling unit 19 selects a reference delay amount from among the delay amounts calculated by the calculating unit 18. In this situation, the reference delay amount may be the smallest value among the delay amounts or may be one of the delay amounts closest to the average of the delay amounts.

Further, the image quality controlling unit 19 selects one of the delay amounts calculated by the calculating unit 18 as a judgment target delay amount and further calculates a delay amount difference by subtracting the reference delay amount from the selected delay amount. If the calculated delay amount difference is equal to or larger than the first threshold value and smaller than the second threshold value that is larger than the first threshold value, the image quality controlling unit 19 determines the delay amount difference to fall in a range of very small differences. In that situation, the image quality controlling unit 19 outputs a change notice instructing that the issuance frequency of mouse position interrupt notifications be lowered and an indication identifying the terminal device corresponding to the selected delay amount, to the communicating unit 12. Further, the image quality controlling unit 19 outputs the indication identifying the terminal device corresponding to the selected delay amount and information indicating that no image control shall be exercised, to the image generating unit 20.

If the delay amount difference is equal to or larger than the second threshold value and smaller than the third threshold value that is larger than the second threshold value, the image quality controlling unit 19 determines the delay amount difference to fall in a range of small differences. In that situation, the image quality controlling unit 19 outputs an instruction indicating that the image compression rate be set to a first compression rate and an indication identifying the terminal device corresponding to the selected delay amount, to the image generating unit 20. Alternatively, the image quality controlling unit 19 may output an instruction indicating that the image resolution level be lowered to a first resolution level that is lower than a normal resolution level that is used when no image control is exercised, as well as the indication identifying the terminal device corresponding to the selected delay amount, to the image generating unit 20.

If the delay amount difference is equal to or larger than the third threshold value and smaller than a fourth threshold value that is larger than the third threshold value, the image quality controlling unit 19 determines the delay amount difference to fall in a range of medium differences. In that situation, the image quality controlling unit 19 outputs an instruction indicating that the image compression rate be set to a second compression rate that is higher than the first compression rate and an indication identifying the terminal device corresponding to the selected delay amount, to the image generating unit 20. Alternatively, the image quality controlling unit 19 may output an instruction indicating that the image resolution level be lowered to a second resolution level that is lower than the first resolution level, and the indication identifying the terminal device corresponding to the selected delay amount, to the image generating unit 20. As explained here, if the delay amount difference falls in the range of small or medium differences, the image quality controlling unit 19 performs the process of lowering the quality of the images to be transmitted in accordance with the size of the delay amount difference.

If the delay amount difference is equal to or larger than the fourth threshold value, the image quality controlling unit 19 determines the delay amount difference to fall in a range of large differences. In that situation, the image quality controlling unit 19 outputs an instruction indicating that the frame rate of the images to be transmitted be lowered and an indication identifying the terminal device corresponding to the selected delay amount, to the image generating unit 20. If the delay amount difference is smaller than the first threshold value, the image quality controlling unit 19 outputs the received indication identifying the terminal device and an instruction indicating that no image control shall be exercised, to the image generating unit 20, and the process is thus ended.

As explained above, as a result of reducing the data amount of the images to be transmitted via the communication path having a large delay amount difference, the distribution server 10 is able to synchronize the images displayed by the terminal devices 3 to 5. In the embodiment described above, an example is explained in which the control is exercised in accordance with the delay amount difference on one of the factors selected from: the issuance frequency of the mouse position interrupt notifications, the image resolution level, the image compression rate, and the image frame rate. However, possible embodiments are not limited to this example. For example, the image quality controlling unit 19 may instruct that the frame rate be lowered if the delay amount difference falls in the range of medium differences and may instruct that the image compression rate be raised and, at the same time, the frame rate be lowered, if the delay amount difference falls in the range of large differences.

Figure 8:
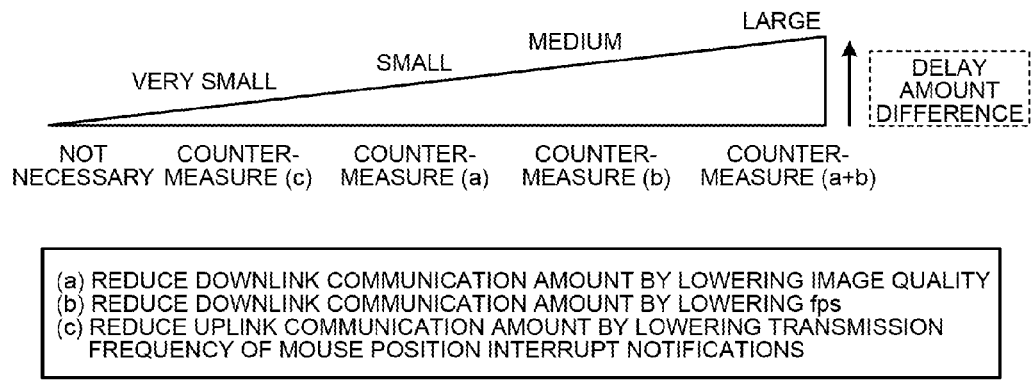
FIG. 8 is a drawing for explaining an example of communication control performed by the distribution server according to the first embodiment.

For example, FIG. 8 is a drawing for explaining an example of the communication control performed by the distribution server according to the first embodiment. For example, in the example illustrated in FIG. 8, if the delay amount difference falls in the range of very small differences, the image quality controlling unit 19 instructs that countermeasure (c) be taken by which the uplink communication amount is reduced by lowering the transmission frequency of mouse position interrupt notifications. If the delay amount difference falls in the range of small differences, the image quality controlling unit 19 instructs that countermeasure (a) be taken by which the downlink communication amount is reduced by raising the compression rate of the images to be transmitted and thereby lowering the image quality.

If the delay amount difference falls in the range of medium differences, the image quality controlling unit 19 instructs that countermeasure (b) be taken by which the downlink communication amount is reduced by lowering the frame rate (i.e., fps). If the delay amount difference falls in the range of large differences, the image quality controlling unit 19 instructs that countermeasures (a) and (b) be taken together at the same time so as to further reduce the downlink communication amount. As a result, the distribution server 10 is able to synchronize the images displayed by the plurality of terminal devices including one or more terminal devices of which the communication path has a large delay amount difference, such as a terminal device installed in a distant location or a terminal device having an unstable communication path.

Among countermeasures (a) to (c) described above, the largest effect in reducing the communication amount is achieved by taking countermeasure (b), and the second largest effect in reducing the communication amount is achieved by taking countermeasure (a). Further, the image quality controlling unit 19 may instruct that countermeasures (a) and (c) be taken together at the same time or instruct that countermeasures (a), (b), and (c) be taken together at the same time.

Returning to the description of FIG. 5, the image generating unit 20 generates the images to be transmitted to each of the terminal devices 3 to 5, by following the instructions from the image quality controlling unit 19. For example, the image generating unit 20 generates a reference image on the basis of data received from the operation controlling unit 21. After that, from the reference image, the image generating unit 20 generates an image having a resolution level, a compression rate, and a frame rate that are set for each of the terminal devices 3 to 5 and outputs the generated images to the communicating unit 12 so that the generated images are transmitted to the terminal devices 3 to 5.

In this situation, for each of the terminal devices 3 to 5, the image generating unit 20 adjusts the settings of the images to be transmitted, by following the instructions from the image quality controlling unit 19. For example, when having received an indication identifying a terminal device and an instruction indicating that no image control shall be exercised from the image quality controlling unit 19, the image generating unit 20 sets the resolution level and the frame rate of the images to be transmitted to the identified terminal device, to values used during normal time periods. In another example, when having received an indication identifying a terminal device and an instruction indicating that the image resolution level be lowered to a first resolution level from the image quality controlling unit 19, the image generating unit 20 sets the resolution level of the images to be transmitted to the identified terminal device, to the first resolution level.

In yet another example, when having received an indication identifying a terminal device and an instruction indicating that the image resolution level be lowered to the second resolution level from the image quality controlling unit 19, the image generating unit 20 sets the resolution level of the images to be transmitted to the identified terminal device, to the second resolution level. In yet another example, when having received an indication identifying a terminal device and an instruction indicating that the image frame rate be lowered from the image quality controlling unit 19, the image generating unit 20 lowers the frame rate of the images to be transmitted to the identified terminal device, to a predetermined value.

In yet another example, when having received an instruction indicating that the compression rate be set to the first compression rate and an indication identifying a terminal device from the image quality controlling unit 19, the image generating unit 20 compresses the images to be transmitted to the identified terminal device at the first compression rate. In yet another example, when having received an instruction indicating that the compression rate be set to the second compression rate and an indication identifying a terminal device from the image quality controlling unit 19, the image generating unit 20 compresses the images to be transmitted to the identified terminal device at the second compression rate. In this situation, the image generating unit 20 is able to compress the images by using an arbitrary means.

In addition, the image generating unit 20 also performs the following process together with the process described above: First, the image generating unit 20 judges whether a predetermined period of time has elapsed since the previous transmission of images to all of the terminal devices 3 to 5. After that, if the image generating unit 20 has determined that the predetermined period of time has elapsed since the previous transmission of images to all of the terminal devices 3 to 5, the image generating unit 20 further judges whether it is now the time to transmit images to all of the terminal devices 3 to 5 simultaneously.

If the image generating unit 20 has determined that it is now the time to transmit images to all of the terminal devices 3 to 5 simultaneously, the image generating unit 20 appends a mark to the images to be transmitted to each of the terminal devices 3 to 5, the mark instructing that a time stamp be transmitted. After that, the image generating unit 20 outputs the mark-appended images to the communicating unit 12, so that the mark-appended images are transmitted to the terminal devices 3 to 5. In addition, the image generating unit 20 stores the time at which the images were transmitted to the terminal devices 3 to 5 into the transmission time table 15.

The operation controlling unit 21 exercises control over the images displayed by the terminal devices 3 to 5 in accordance with mouse position interrupt notifications from the terminal device having the operation right. For example, the operation controlling unit 21 receives the mouse position interrupt notifications from the terminal devices 3 to 5 via the obtaining unit 17.

Further, the operation controlling unit 21 identifies the mouse position interrupt notification received from the terminal device having the operation right, from among the received mouse position interrupt notifications. In accordance with the input operation indicated by the identified mouse position interrupt notification, the operation controlling unit 21 generates data used for generating a new reference image. After that, the operation controlling unit 21 outputs the generated data to the image generating unit 20.

In this situation, if the input operation indicated by the identified mouse position interrupt notification remains unchanged for a predetermined period of time, the operation controlling unit 21 transfers the operation right to another terminal device. After that, the operation controlling unit 21 identifies a mouse position interrupt notification received from the terminal device that newly obtained the operation right.

For example, the acquiring unit 16, the obtaining unit 17, the calculating unit 18, the image quality controlling unit 19, the image generating unit 20, and the operation controlling unit 21 are configured by using one or more electronic circuits. Examples of the electronic circuits that are applicable include integrated circuits such as Application Specific Integrated Circuits (ASICs) and Field Programmable Gate Arrays (FPGAs), as well as Central Processing Units (CPUs), and Micro Processing Units (MPUs).

The storage unit 11 is configured by using a storage device such as a semiconductor memory device, which may be a Random Access Memory (RAM), a flash memory, or the like.

Figure 9:
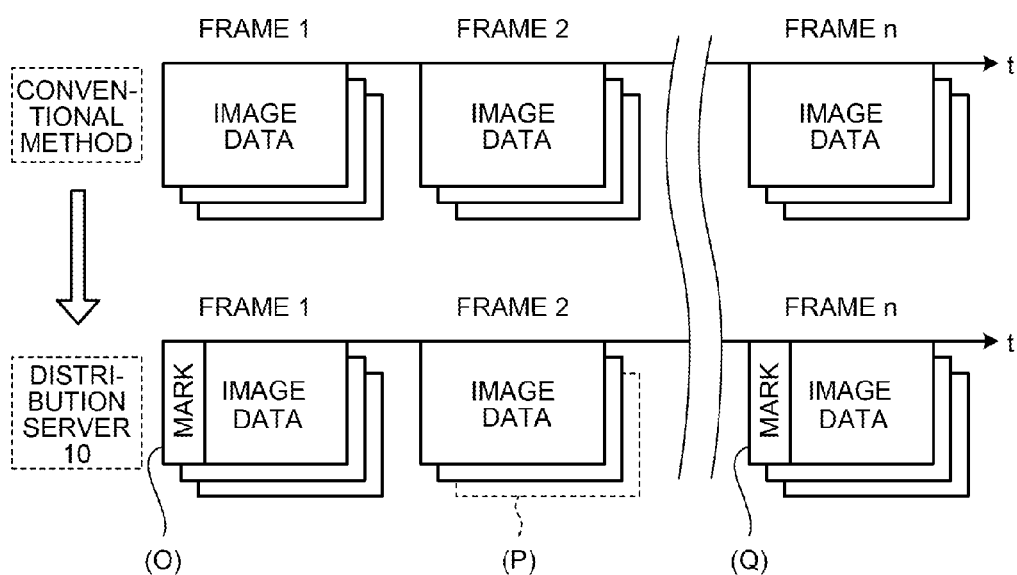
FIG. 9 is a drawing for explaining exemplary data structures of packets transmitted by the distribution server according to the first embodiment.

Next, exemplary data structures of packets transmitted and received by the distribution server 10 will be explained, with reference to FIGS. 9 and 10. First, the exemplary data structures of the packets transmitted by the distribution server 10 will be explained, with reference to FIG. 9. FIG. 9 is a drawing for explaining the exemplary data structures of the packets transmitted by the distribution server according to the first embodiment. FIG. 9 illustrates examples of packets to be transmitted in frames 1 to n by a distribution server according to a conventional method and by the distribution server 10 according to the first embodiment.

For example, the distribution server according to the conventional method stores mutually the same pieces of image data into all the packets to be transmitted to each of the terminal devices 3 to 5 in frames 1 to n and transmits the packets. In contrast, when the distribution server 10 transmits a packet storing image data therein to all of the terminal devices 3 to 5 in frame 1, the distribution server 10 appends a mark to each packet storing the image data therein as indicated by in FIG. 9 (O) and transmits the mark-appended packets.

As a result, the distribution server 10 receives a mouse position interrupt notification to which a time stamp is appended, from each of the terminal devices 3 to 5. After that, the distribution server 10 calculates a delay amount of each of the communication paths to the terminal devices 3 to 5, by using the transmission time of the packet in frame 1, the time indicated by the time stamp, and the time difference.

Further, as indicated by FIG. 9 (P), for example, if the frame rate of the images to be transmitted to the terminal device 5 installed in a distant location has been lowered, the distribution server 10 does not generate any packet to be transmitted to the terminal device 5 in frame 2. Further, because packets are not transmitted to all of the terminal devices in frame 2, the distribution server 10 transmits a packet to which no mark is appended, to each of the terminal devices 3 and 4.

Further, as indicated by FIG. 9 (Q), when transmitting image data to all of the terminal devices in frame n, the distribution server 10 appends a mark to each of the packets storing the image data therein to be transmitted to the terminal devices 3 to 5 and transmits the mark-appended packets. As a result, the distribution server 10 receives a mouse position interrupt notification to which a time stamp is appended from each of the terminal devices 3 to 5 and is therefore able to newly calculate the most up-to-date delay amount of each of the communication paths to the terminal devices 3 to 5.

Next, the exemplary data structures of the packets received by the distribution server 10 will be explained, with reference to FIG. 10. FIG. 10 is a drawing for explaining the exemplary data structures of the packets received by the distribution server according to the first embodiment. FIG. 10 illustrates examples of packets to be received by the distribution server according to the conventional method and by the distribution server 10 according to the first embodiment, when the image data illustrated in FIG. 9 has been transmitted.

Figure 10:
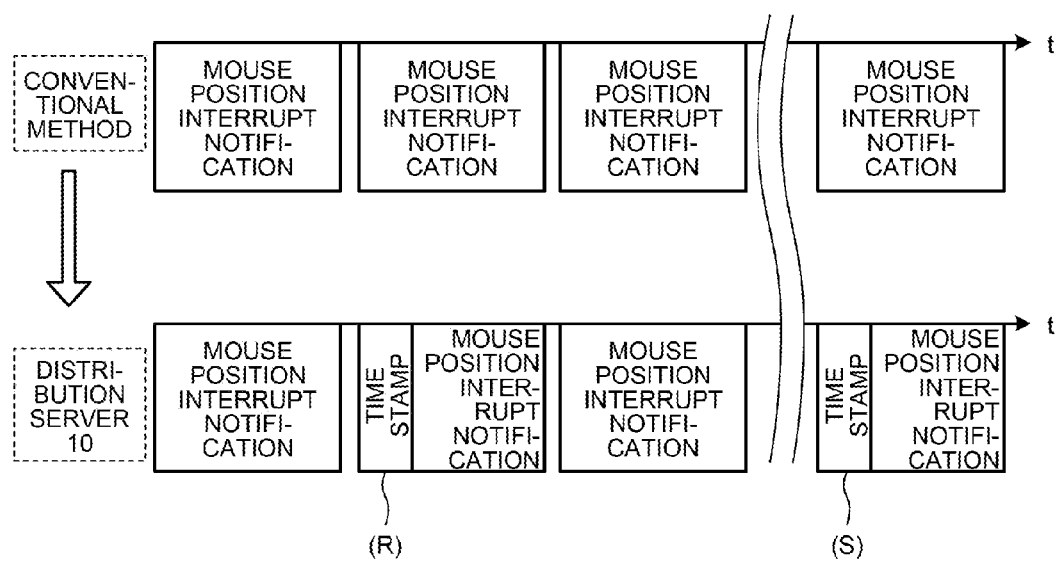
FIG. 10 is a drawing for explaining exemplary data structures of packets received by the distribution server according to the first embodiment.

For example, in the example illustrated in FIG. 10, the distribution server according to the conventional method receives packets each of which simply stores therein a mouse position interrupt notification. In contrast, when the distribution server 10 has transmitted the mark-appended packet, the distribution server 10 receives packets to each of which a mouse position interrupt notification and a time stamp are appended, as indicated by FIG. 10 (R) and FIG. 10 (S).

As explained above, the distribution server 10 appends the marks to the packets to be transmitted to the terminal devices 3 to 5 and subsequently, receives the time stamps together with the mouse position interrupt notifications from the terminal devices 3 to 5. Consequently, the distribution server 10 is able to calculate the delay amount of each of the communication paths to the terminal devices 3 to 5 without the need to newly transmit a measuring-purpose packet to each of the terminal devices 3 to 5.

Figure 11:
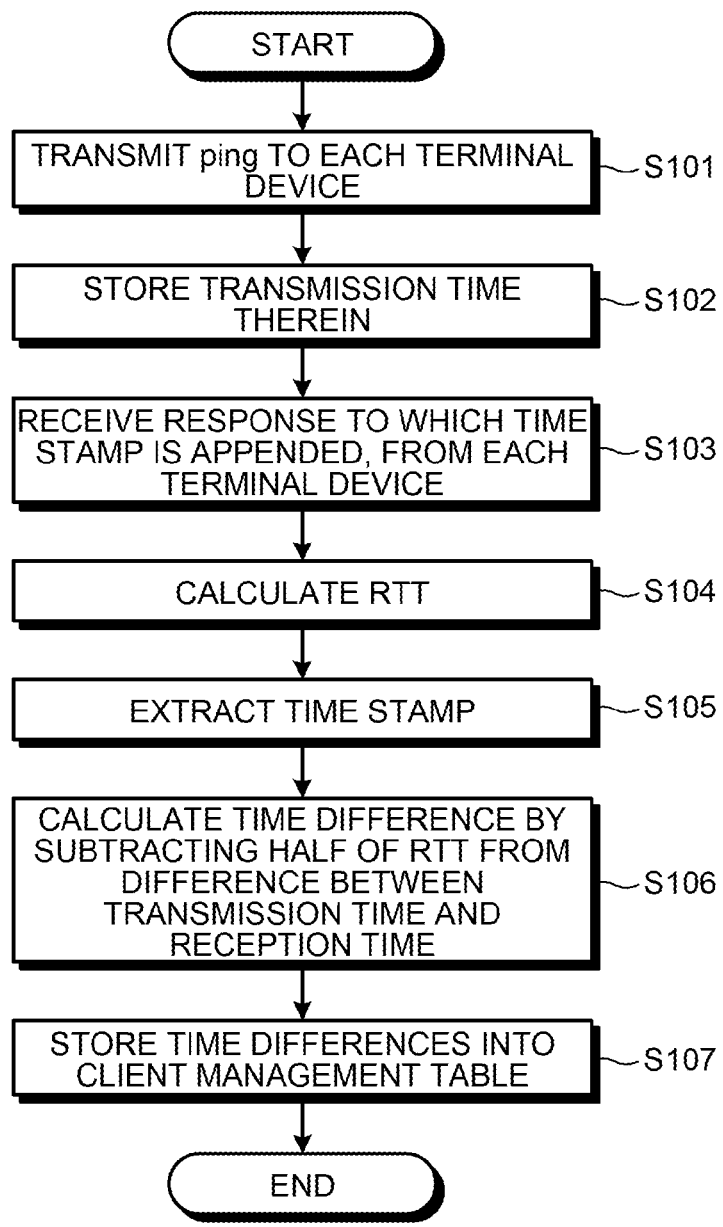
FIG. 11 is a flowchart for explaining a flow in a time difference acquiring process performed by the distribution server according to the first embodiment.

Next, a flow in a process performed by the distribution server 10 to acquire a time difference value of each of the terminal devices 3 to 5 will be explained, with reference to FIG. 11. FIG. 11 is a flowchart for explaining the flow in the time difference acquiring process performed by the distribution server according to the first embodiment. For example, the distribution server 10 transmits a ping to each of the terminal devices 3 to 5 (step S101). Further, the distribution server 10 stores therein the transmission time of the ping (step S102).

After that, the distribution server 10 receives a response to which a time stamp is appended from each of the terminal devices 3 to 5 (step S103) and calculates an RTT from the stored transmission time and the time at which each response was received (step S104). Further, the distribution server 10 extracts the time stamp from each of the received responses (step S105) and calculates a time difference by subtracting half of the RTT value from the difference between the transmission time and the reception time indicated by the time stamp (step S106). After that, the distribution server 10 stores the calculated time differences into the client management table 14 (step S107), and the process is thus ended.

Figure 12:
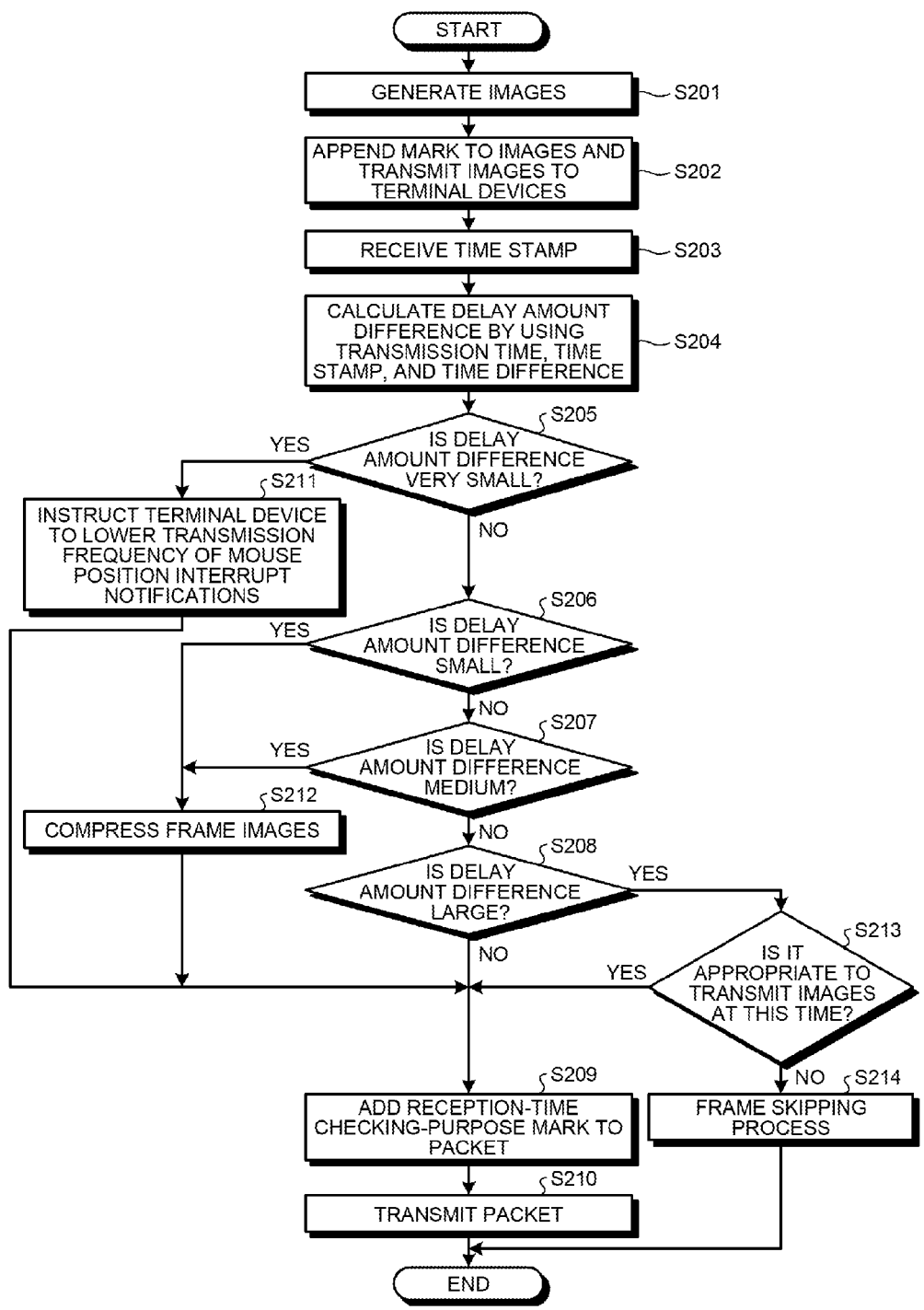
FIG. 12 is a flowchart for explaining a flow in an image transmitting process performed by the distribution server according to the first embodiment.

Next, a flow in an image transmitting process performed by the distribution server 10 to transmit images to the terminal devices 3 to 5 will be explained with reference to FIG. 12. FIG. 12 is a flowchart for explaining the flow in the image transmitting process performed by the distribution server according to the first embodiment. FIG. 12 illustrates the flow in the process that is performed by the distribution server 10 in accordance with the delay amount difference of the communication path to the terminal device 3.

First, the distribution server 10 generates images to be transmitted to the terminal device 3 (step S201), appends a mark to the generated images, and transmits the mark-appended images to the terminal device 3 (step S202). As a result, the distribution server 10 receives a mouse position interrupt notification to which a time stamp is appended, from the terminal device 3 (step S203). Thus, the distribution server 10 calculates a delay amount of the communication path to the terminal device 3 by using the transmission time of the image data, the time stamp, and the time difference and further calculates a difference between the calculated delay amount and the delay amounts of the other communication paths (step S204).

In this situation, the distribution server 10 judges whether or not the delay amount difference falls in the range of very small differences (step S205). If the delay amount difference is determined not to fall in the range of very small differences (step S205: No), the distribution server 10 further judges whether or not the delay amount difference falls in the range of small differences (step S206). If the delay amount difference is determined not to fall in the range of small differences (step S206: No), the distribution server 10 further judges whether or not the delay amount difference falls in the range of medium differences (step S207). If the delay amount difference is determined not to fall in the range of medium differences (step S207: No), the distribution server 10 further judges whether or not the delay amount difference falls in the range of large differences (step S208).

If the delay amount difference is determined not to fall in the range of large differences (step S208: No), i.e., if the delay amount difference is determined to be smaller than the very small level, the distribution server 10 adds a mark used for checking the reception time to the packet (step S209). After that, the distribution server 10 transmits the packet to the terminal device 3 (step S210), and the process is thus ended.

On the contrary, if the delay amount difference is determined to fall in the range of very small differences (step S205: Yes), the distribution server 10 instructs the terminal device 3 to lower the transmission frequency of mouse position interrupt notifications (step S211) and further performs the process at step S209. If the delay amount difference is determined to fall in the range of small differences (step S206: Yes), or if the delay amount difference is determined to fall in the range of medium differences (step S207: Yes), the distribution server 10 performs the following process: In accordance with the delay amount difference, the distribution server 10 compresses the frame images to be transmitted, while maintaining the current image resolution level (step S212), and further performs the process at step S209.

If the delay amount difference is determined to fall in the range of large differences (step S208: Yes), the distribution server 10 judges whether it is appropriate to transmit the images at this time (step S213). If the distribution server 10 has determined that it is appropriate (step S213: Yes), the distribution server 10 performs the process at step S209. On the contrary, if the distribution server 10 has determined that no images will be transmitted at this time (step S213: No), the distribution server 10 performs a frame skipping process, which is to skip the image transmission (step S214), and the process is thus ended.

Advantageous Effect of the Distribution Server 10

As explained above, the distribution server 10 stores therein the time difference values indicating the differences between the time clocked by the distribution server 10 and the time clocked by each of the terminal devices 3 to 5. Further, the distribution server 10 transmits the images to each of the terminal devices 3 to 5 and obtains the time at which each of the terminal devices 3 to 5 received the images. Further, the distribution server 10 calculates the delay amount of each of the communication paths used for transmitting the images to the terminal devices 3 to 5, on the basis of the time at which the images were transmitted to the terminal devices 3 to 5, the time at which each of the terminal devices 3 to 5 received the images, and the stored time difference values. After that, the distribution server 10 identifies the differences in the calculated delay amounts and controls the communication amounts with the terminal devices 3 to 5 in accordance with the identified delay amount differences.

Accordingly, the distribution server 10 is able to easily synchronize the images displayed by the terminal devices 3 to 5, without the need to perform the process of synchronizing the times clocked by the terminal devices 3 to 5 and the distribution server 10 or the process of transmitting a new packet to the terminal devices 3 to 5. Further, when controlling the communication amounts with the terminal devices 3 to 5 so as to eliminate the identified delay amount differences, the distribution server 10 is able to synchronize the images displayed by the terminal devices 3 to 5.

Further, the distribution server 10 transmits the ping to each of the terminal devices 3 to 5 and receives the responses each storing therein the time stamp that indicates the time at which the corresponding one of the terminal devices 3 to 5 received the ping. Further, for each of the terminal devices 3 to 5, the distribution server 10 measures the RTT, which is the time period between the transmission of the ping and the reception of the response.

Further, for each of the terminal devices 3 to 5, the distribution server 10 calculates the time difference value by subtracting half of the calculated RTT value from the subtraction result between the time indicated by the time stamp stored in the received response and the transmission time of the ping. After that, the distribution server 10 stores the calculated time difference values into the client management table 14. Accordingly, the distribution server 10 is able to measure the time differences between the times clocked by the terminal devices 3 to 5 and the time clocked by the distribution server 10, without the need to perform complicated processes.

Further, when transmitting the images to each of all the terminal devices 3 to 5, the distribution server 10 appends the marks to the images and transmits the mark-appended images. Further, from each of the terminal devices 3 to 5 that received the mark-appended images, the distribution server 10 receives the mouse position interrupt notification to which the time stamp is appended, the time stamp indicating the time at which the mark-appended data was received. Accordingly, the distribution server 10 is able to calculate the delay amount differences of the communication paths to the terminal devices 3 to 5, without the need to transmit a new packet to the terminal devices 3 to 5.

Further, for example, if the difference between the delay amount of the communication path to the terminal device 5 and the delay amounts of the communication paths to the terminal devices 3 and 4 is equal to or larger than the first threshold value, the distribution server 10 instructs the terminal device 5 to lower the frequency with which the mouse position interrupt notifications are transmitted. Accordingly, the distribution server 10 reduces the uplink communication amount to be transmitted from the terminal device 5 to the distribution server 10 and is thus able to ensure the reduction of the delay amount differences, while maintaining the bandwidth of the communication path to the terminal device 5.

Further, for example, if the difference between the delay amount of the communication path to the terminal device 5 and the delay amounts of the communication paths to the terminal devices 3 and 4 is equal to or larger than the second threshold value, the distribution server 10 performs the following process: The distribution server 10 sets the image quality value of the images to be transmitted to the terminal device 5 to be lower than the image quality value of the images to be transmitted to the other terminal devices 3 and 4. For example, the distribution server 10 adjusts the image quality by taking a countermeasure such as raising the compression rate of the images. Accordingly, the distribution server 10 reduces the downlink communication amount to be transmitted from the distribution server 10 to the terminal device 5 and is thus able to ensure the reduction of the delay amount difference of the communication path to the terminal device 5.

Further, for example, if the difference between the delay amount of the communication path to the terminal device 5 and the delay amounts of the communication paths to the terminal devices 3 and 4 is equal to or larger than the fourth threshold value, the distribution server 10 performs the following process: The distribution server 10 sets the frequency with which the images are transmitted to the terminal device 5 to be lower than the frequency with which the images are transmitted to the other terminal devices. Accordingly, the distribution server 10 significantly reduces the downlink communication amount to be transmitted from the distribution server 10 to the terminal device 5 and is thus able to ensure a further reduction of the delay amount difference of the communication path to the terminal device 5.

[b] Second Embodiment

The exemplary embodiments of the present disclosure have thus been explained. However, it is possible to carry out the present disclosure in various different modes other than the exemplary embodiments described above. In the following sections, other exemplary embodiments of the present disclosure will be explained as a second embodiment.

(1) Regarding the Threshold Values

The distribution server 10 described above selects the one or more countermeasures to be taken for reducing the delay amount differences among the communication paths to the terminal devices 3 to 5, by using the plurality of threshold values. However, possible embodiments are not limited to this example. For instance, the distribution server 10 may judge whether or not only one of the following processes shall be performed or not, by using a single threshold value: the mouse position interrupt notifications, the image resolution level, and the frame rate. Further, the distribution server 10 may reduce the delay amount differences among the communication paths by taking an arbitrary countermeasure other than those described above.

Further, the distribution server 10 described above calculates the delay amount differences by comparing the delay amounts with one another. However, possible embodiments are not limited to this example. For instance, if the delay amount of the communication path to the terminal device 3 exceeds the frame rate, the distribution server 10 may reduce the frame rate of the images to be transmitted to the terminal device 3 by half. Further, the distribution server 10 may use the average value, a standard deviation, the smallest value, or the like of the delay amounts, as the reference delay amount.

Further, the various types of threshold values described above are merely examples. Any arbitrary threshold values may be set in accordance with the configuration of the communication system 1. Further, the various types of threshold values described above may be threshold values that can be changed from the outside of the distribution server 10. Further, the distribution server 10 may arrange the threshold values to be variable, depending on the time period of the day or the number of terminal devices to which the images are transmitted.

(2) Regarding the Transmission Time Table

The distribution server 10 described above calculates the delay amount differences among the terminal devices 3 to 5, when transmitting the images to each of all the terminal devices 3 to 5. However, possible embodiments are not limited to this example. In another example, the distribution server 10 appends marks to the images to be transmitted to the terminal devices 3 to 5 at predetermined time intervals, transmits the mark-appended images, and further stores the client IP addresses of the terminal devices serving as the transmission destinations of the images and the transmission time into the transmission time table 15 so as to be kept in correspondence with one another.

Further, when having received the mouse position interrupt notification to which the time stamp is appended from any of the terminal devices 3 to 5, the distribution server 10 obtains the transmission time kept in correspondence with the client IP address of the terminal device from which the mouse position interrupt notification was transmitted by referring to the transmission time table 15. After that, the distribution server 10 calculates a delay amount by using the obtained transmission time, the time stamp appended to the mouse position interrupt notification, and the time difference value stored in the client management table 14 and further calculates a delay amount difference by comparing the calculated delay amounts. In this manner, the distribution server 10 may calculate the delay amount difference of the communication path for each of the terminal devices 3 to 5. In this situation, the distribution server 10 may store therein a reference delay amount in advance and may calculate a delay amount difference individually by comparing the delay amount of each of the terminal devices 3 to 5 with the reference delay amount.

(3) Regarding the Functional Configuration of the Distribution Server 10

The functional configuration of the distribution server 10 described above is merely an example. As long as the distribution server 10 is able to realize the same processes, any arbitrary configuration may be used. For example, the distribution server 10 may be configured so that the functions of the acquiring unit 16 are divided. Further, the distribution server 10 may be configured so that the functions of the acquiring unit 16 are realized by the obtaining unit 17 and the calculating unit 18. Further, the distribution server 10 may include a distribution controlling unit that has the functions of the image quality controlling unit 19, the image generating unit 20, and the operation controlling unit 21.

(4) Regarding the Data

The distribution server 10 described above transmits the images to the terminal devices 3 to 5. However, possible embodiments are not limited to this example. For example, the distribution server 10 may distribute audio at the same time as the distribution server 10 distributes the images. Alternatively, the distribution server 10 may distribute only audio, instead of the images.

(5) Computer Programs

The functions realized by the distribution server 10 explained in the exemplary embodiments above may be realized as a computer executes a distribution computer program (hereinafter, "distribution program") prepared in advance. Next, an example of the computer that executes the distribution program having the same functions as those of the distribution server 10 described above will be explained, with reference to FIG. 13.

Figure 13:
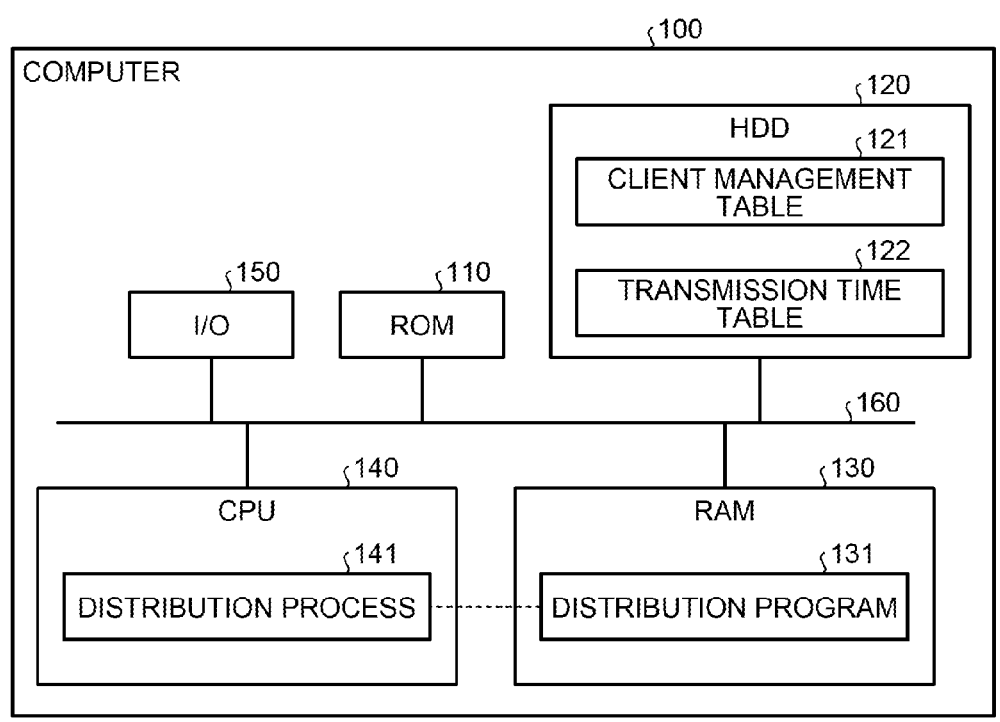
FIG. 13 is a drawing for explaining an example of a computer that executes a distribution program.

FIG. 13 is a drawing for explaining the example of the computer that executes the distribution program. In a computer 100 illustrated in FIG. 13, a Read-Only Memory (ROM) 110, a Hard Disk Drive (HDD) 120, a Random Access Memory (RAM) 130, a Central Processing Unit (CPU) 140 are connected together by a bus 160. Further, the computer 100 illustrated in FIG. 13 includes an Input/Output (I/O) unit 150 for transmitting and receiving packets.

The HDD 120 stores therein a client management table 121 storing therein the same data as the data stored in the client management table 14; and a transmission time table 122 storing therein the same data as the data stored in the transmission time table 15. Further, the RAM 130 stores therein a distribution program 131 in advance. In the example illustrated in FIG. 13, as a result of the CPU 140 reading the distribution program 131 from the RAM 130 and executing the read distribution program 131, the distribution program 131 is caused to function as a distribution process 141. The distribution process 141 realizes the same functions as those of the acquiring unit 16, the obtaining unit 17, the calculating unit 18, the image quality controlling unit 19, the image generating unit 20, and the operation controlling unit 21 illustrated in FIG. 5.

It is possible to realize the distribution program explained in the exemplary embodiments, by causing a computer such as a personal computer or a workstation to execute a program prepared in advance. The program may be distributed via a network such as the Internet. Further, the program may be recorded on a computer-readable recoding medium such as a hard disk, a flexible disk (FD), a Compact Disk Read-Only Memory (CD-ROM), a Magneto-Optical (MO) Disk, a Digital Versatile Disk (DVD). Further, the program may be executed as being read from the recording medium by a computer.

According to an aspect of an embodiment, it is possible to easily synchronize the images displayed by the plurality of terminal devices.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus that transmits a data packet to terminal devices, the information processing apparatus comprising a memory and a processor coupled to the memory, the processor being configured to execute a process including:

transmitting a first data packet to the terminal devices;

obtaining from a terminal device among the terminal devices information indicating a time at which the terminal device has received the first data packet;

reading a time difference stored in a storage device, the time difference indicating a difference between a time clocked by the terminal device and a time clocked by the information processing apparatus and further calculating a delay amount of a path used for transmitting the first data packet to the terminal device, by using a difference between a time at which the first data packet is transmitted and the time indicated by the obtained information and the read time difference, the delay amount indicating a time taken for transmitting the first data packet from the information processing apparatus to the terminal device;

identifying a delay amount difference indicating a difference between the calculated delay amount and other delay amounts for other terminal devices and further controlling a data amount of a second data packet to be transmitted to the terminal device in accordance with the identified delay amount difference;

transmitting a measuring-purpose packet to the terminal device;

receiving a response from the terminal device, the response storing therein information indicating a time at which the measuring-purpose packet was received;

measuring a time period between a time at which the measuring-purpose packet was transmitted and a time at which the response was received; and calculating a value by subtracting half of the measured time period from difference between the time indicated by the information stored in the response and the time at which the measuring-purpose packet was transmitted and further storing the calculated value into the storage device, as the time difference between the time clocked by the terminal device and the time clocked by the information processing apparatus;

when the identified delay amount difference is equal to or larger than a first threshold value, the controlling includes instructing the terminal device to lower frequency with which interrupt notifications are transmitted to the information processing apparatus.

2. The information processing apparatus according to claim 1, wherein the transmitting includes transmitting, when transmitting a data packet to all of the terminal devices, the data packet, as an identifier-appended data packet, to which a predetermined identifier is appended, and the obtaining includes obtaining, from each of the terminal devices that received the identifier-appended data packet, an interrupt notification having information appended thereto, the information indicating a time at which the identifier-appended data packet was received.

3. The information processing apparatus according to claim 1, wherein when the identified delay amount difference is equal to or larger than a second threshold value, the controlling includes setting image quality of the second data packet to be transmitted to the terminal device to be at a lower level than image quality of the second data packet to be transmitted to other terminal devices.

4. The information processing apparatus according to claim 1, wherein when the identified delay amount difference is equal to or larger than a third threshold value, the controlling includes setting frequency with which second data packets are to be transmitted to the terminal device to be lower than frequency with which second data packets are to be transmitted to other terminal devices.

5. A distribution method implemented by an information processing apparatus that transmits a data packet to terminal devices, the distribution method comprising:
   transmitting a first data packet to the terminal devices;
   obtaining from a terminal device among the terminal devices information indicating a time at which the terminal device has received the first data packet;
   reading a time difference stored in a storage device, the time difference indicating a difference between a time clocked by the terminal device and a time clocked by the information processing apparatus and further calculating a delay amount of a path used for transmitting the first data packet to the terminal device, by using a difference between a time at which the first data packet is transmitted and the time indicated by the obtained information and the read time difference, the delay amount indicating a time taken for transmitting the first data packet from the information processing apparatus to the terminal device;
   identifying a delay amount difference indicating a difference between the calculated delay amount and other delay amounts for other terminal devices;
   controlling a data amount of a second data packet to be transmitted to the terminal device in accordance with the identified delay amount difference;
   transmitting a measuring-purpose packet to the terminal device;
   receiving a response from the terminal device, the response storing therein information indicating a time at which the measuring-purpose packet was received;
   measuring a time period between a time at which the measuring-purpose packet was transmitted and a time at which the response was received; and
   calculating a value by subtracting half of the measured time period from difference between the time indicated by the information stored in the response and the time at which the measuring-purpose packet was transmitted and further storing the calculated value into the storage device, as the time difference between the time clocked by the terminal device and the time clocked by the information processing apparatus;
   when the identified delay amount difference is equal to or larger than a first threshold value, the controlling includes instructing the terminal device to lower frequency with which interrupt notifications are transmitted to the information processing apparatus.

6. A non-transitory computer-readable recording medium having stored therein a program for causing a computer to execute a process comprising:
   transmitting a first data packet to terminal devices;
   obtaining from a terminal device among the terminal devices information indicating a time at which the terminal device has received the first data packet;
   reading a time difference stored in a storage device, the time difference indicating a difference between a time clocked by the terminal device and a time clocked by the computer and further calculating a delay amount of a path used for transmitting the first data packet to the terminal device, by using a difference between a time at which the first data packet is transmitted and the time indicated by the obtained information and the read time difference, the delay amount indicating a time taken for transmitting the first data packet from the computer to the terminal device;
   identifying a delay amount difference indicating a difference between the calculated delay amount and other delay amounts for other terminal devices;
   controlling a data amount of a second data packet to be transmitted to the terminal device in accordance with the identified delay amount difference;
   transmitting a measuring-purpose packet to the terminal device;
   receiving a response from the terminal device, the response storing therein information indicating a time at which the measuring-purpose packet was received;
   measuring a time period between a time at which the measuring-purpose packet was transmitted and a time at which the response was received; and
   calculating a value by subtracting half of the measured time period from difference between the time indicated by the information stored in the response and the time at which the measuring-purpose packet was transmitted and further storing the calculated value into the storage device, as the time difference between the time clocked by the terminal device and the time clocked by the information processing apparatus;
   when the identified delay amount difference is equal to or larger than a first threshold value, the controlling includes instructing the terminal device to lower frequency with which interrupt notifications are transmitted to the information processing apparatus.

* * * * *